Jan. 26, 1943.   S. M. STAFFORD   2,309,142
APPARATUS FOR GAUGING MACHINE PARTS
Filed Nov. 28, 1941   6 Sheets-Sheet 1
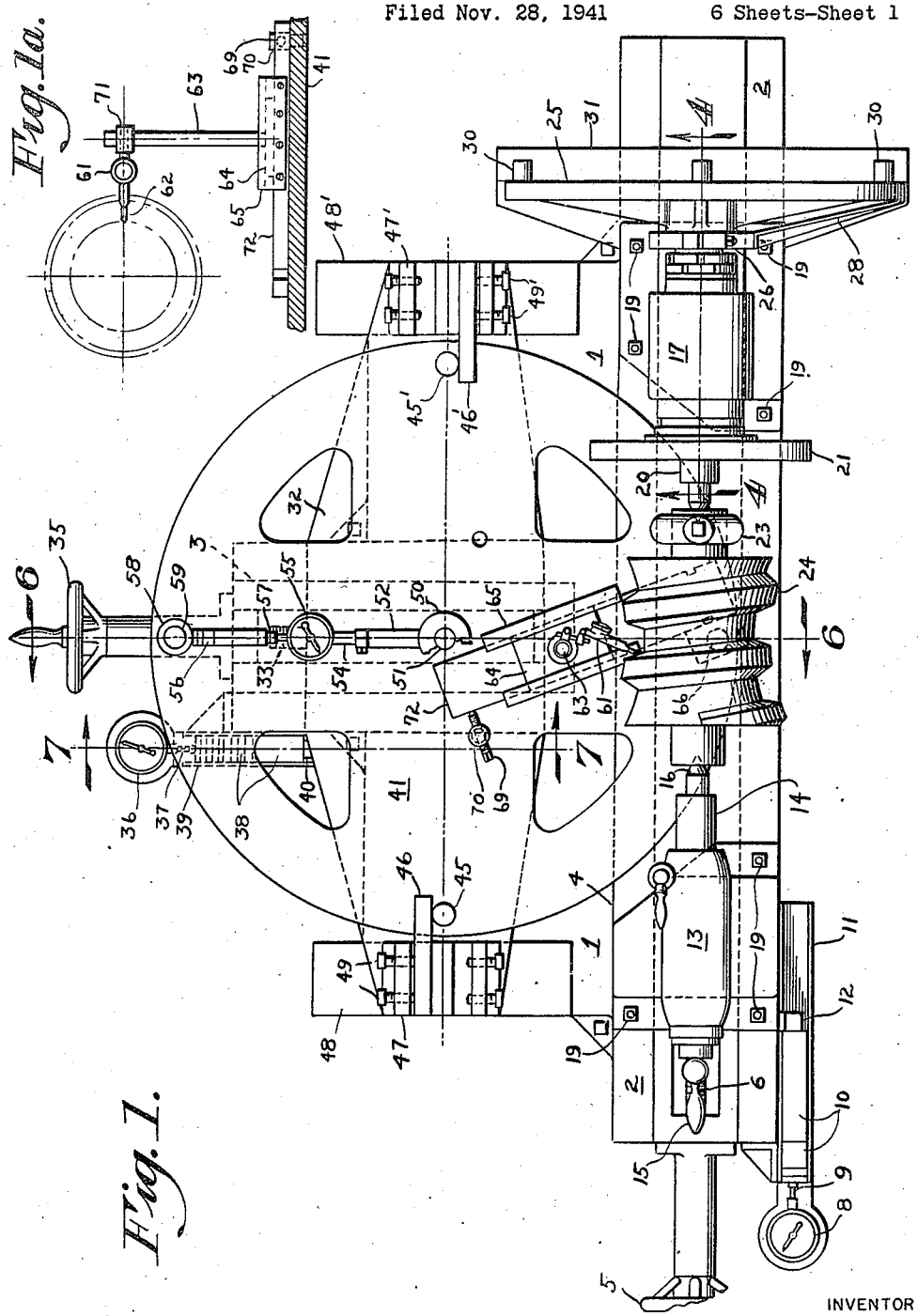
INVENTOR
S. M. Stafford
BY
ATTORNEY

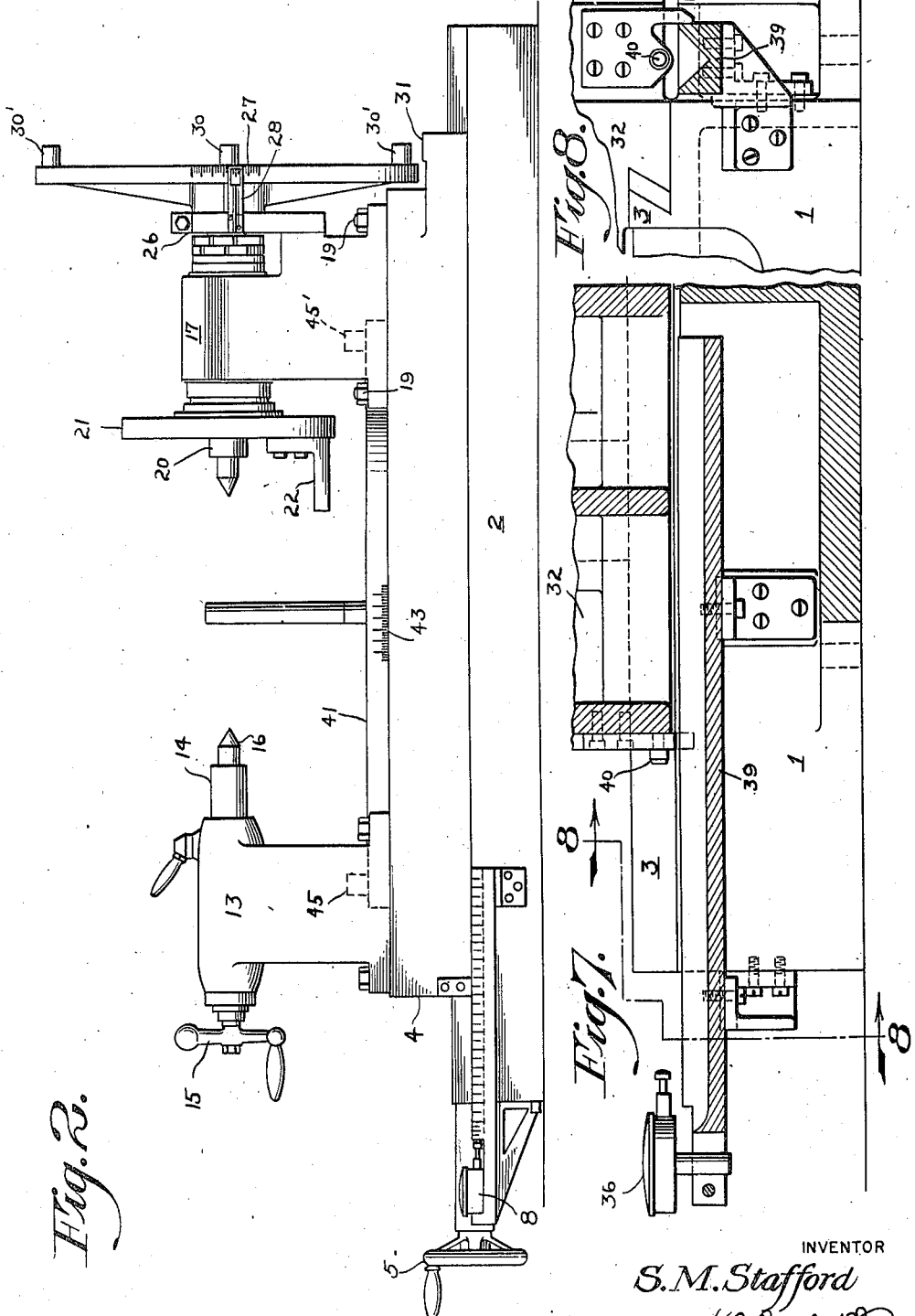

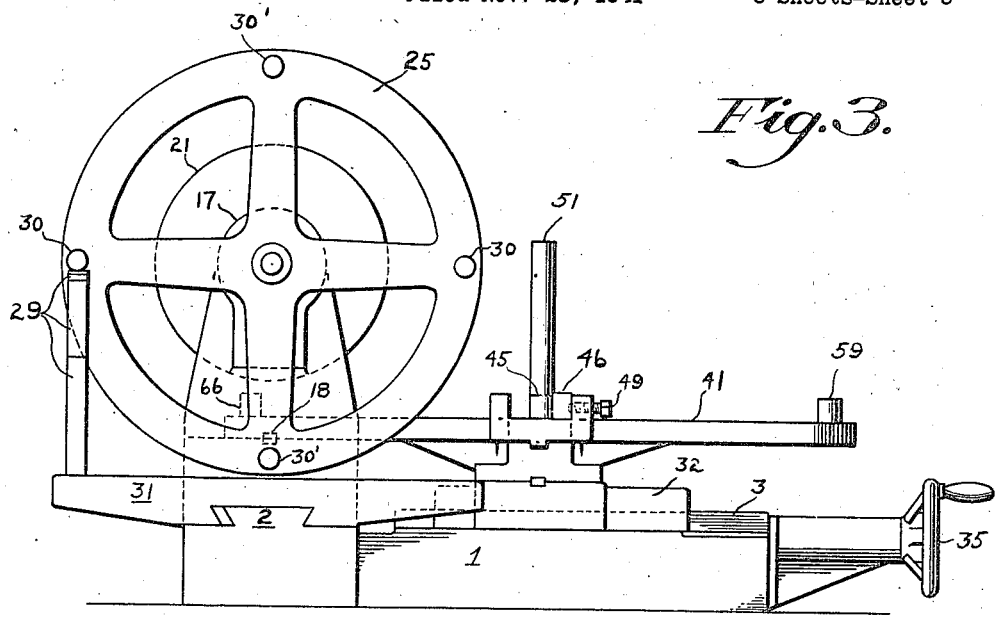
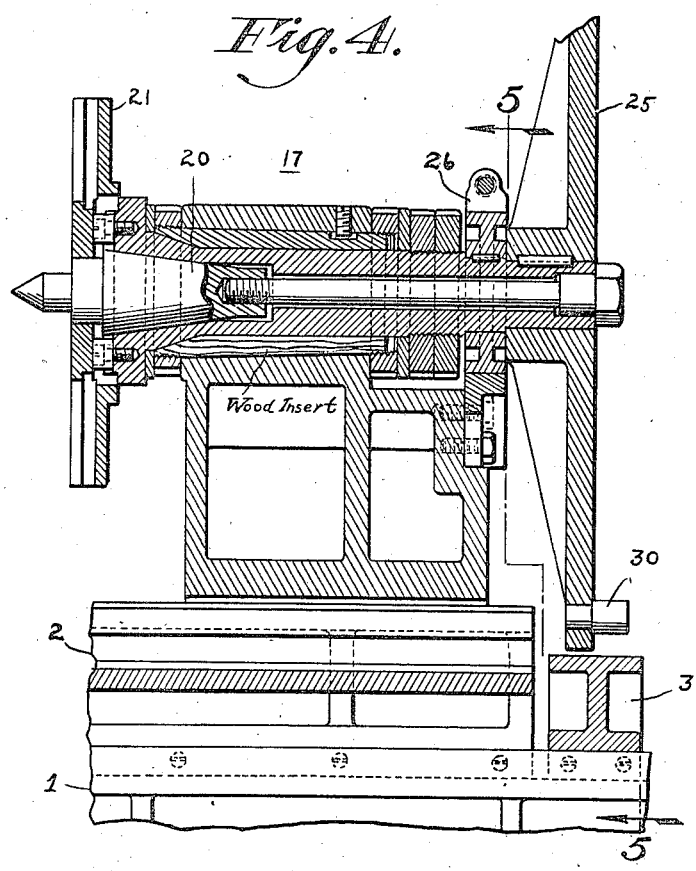
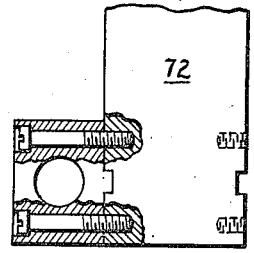

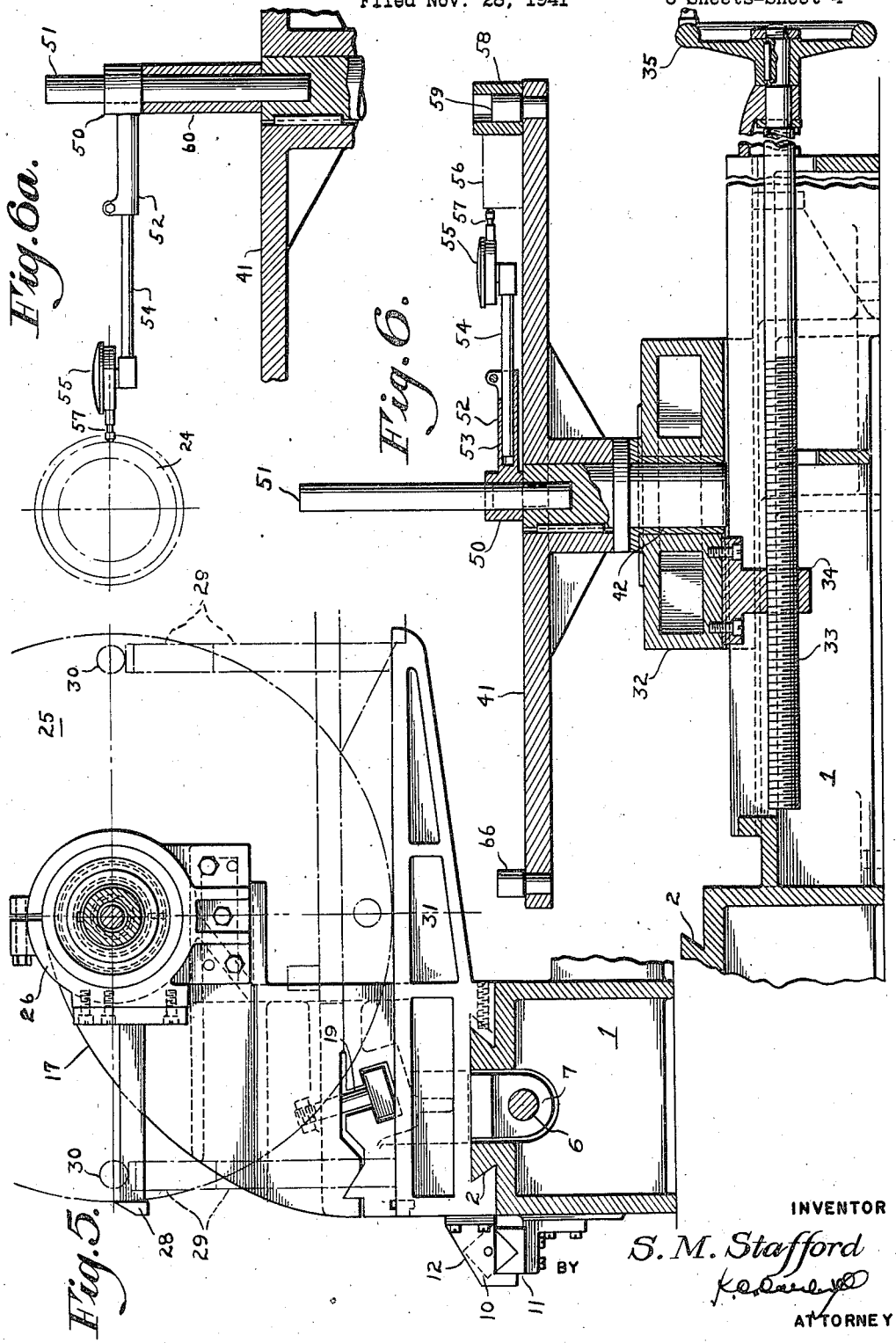

Jan. 26, 1943.  S. M. STAFFORD  2,309,142
APPARATUS FOR GAUGING MACHINE PARTS
Filed Nov. 28, 1941  6 Sheets-Sheet 5

INVENTOR
S.M. Stafford
BY
ATTORNEY

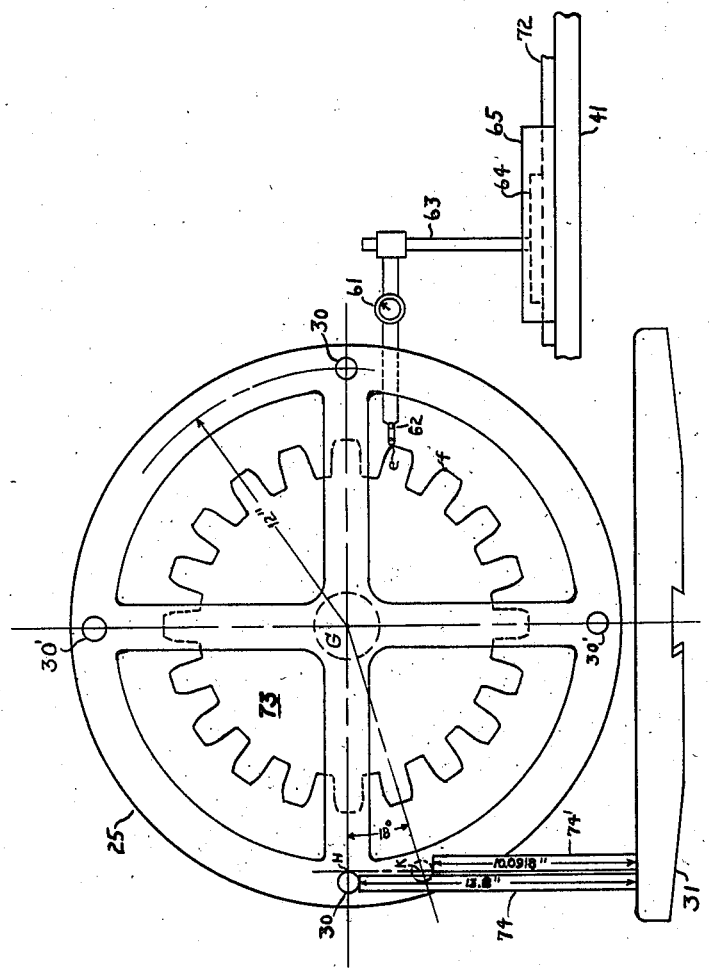

Patented Jan. 26, 1943

2,309,142

UNITED STATES PATENT OFFICE 2,309,142

APPARATUS FOR GAUGING MACHINE PARTS

Stephen M. Stafford, Chevy Chase, Md.

Application November 28, 1941, Serial No. 420,843

8 Claims. (Cl. 33—179.5)

(Granted under the act of March 3, 1883, as amended April 30, 1928; 370 O. G. 757)

The invention described herein relates in general to gauging apparatus and in particular to such apparatus for gauging machine parts. The apparatus may be applied, for example, for checking pitch and tooth angles and also the various diameters of gears, thread angle and lead of screws and worms, spacing between shaft splines and other annularly arranged elements.

Heretofore, gauging operations have been carried out with much difficulty because it has been impossible to maintain precise gauging standards in the machines. The machines now available either do not afford the high degree of precision required for gauging or are unable to maintain their initial precision due to parts wear. By means of my improved apparatus, however, all sources of possible error are eliminated since only standard gauge blocks such as for example the well known Johannessen gauges and standard precision micrometers are utilized for determining the precise measurements of the particular machine part.

It is therefore a broad object of my invention to provide an improved gauging machine which is simple in design, economical to manufacture and most accurate and dependable in operation.

Another object is to provide a novel method of gauging the pitch of a machine part element such as for example a gear tooth in which stops are set up in the path of gear rotation, the distance between which is based upon a function of the pitch angle in order that the gear may be rotated through precisely one circular pitch.

A further object is to provide an improved apparatus for gauging the pitch of a machine part element such as for example a gear tooth in which standard gauge blocks set up to a length based upon a function of the pitch angle are utilized for turning the gear through precisely one circular pitch whereby an indicator, when brought into contact with a particular point on one tooth, may readily establish the accuracy of the distance to a similar point on the next adjacent tooth as the gear is so turned.

Still another object of my invention is to provide a gauging machine for checking the lead on a worm in which gauge blocks set up to a length based upon a function of the pitch angle of the mating gear to the worm are utilized for turning an indicator in contact with the worm thread precisely through such angle whereby the thread lead may be accurately gauged.

A still further object is to provide for accurately gauging the thread on a worm throughout a complete lead thereof.

Another object of the invention is to provide a gauging machine for checking the thread angle of a worm in which gauge blocks set up to a length based upon a function of the angle are utilized for positioning a sensitive indicator at said angle with respect to the worm thread.

Another object is to provide a machine for gauging peripheral surfaces of a machine part of the type described herein such as for example a gear in which gauge blocks are utilized for presetting a micrometer, which is then placed in gauging contact with the particular periphery to be gauged.

These and other objects of my invention will become more apparent from the following detailed description and the accompanying drawings in which:

Fig. 1 is a top plan view of a preferred embodiment of my invention in which a cone type worm, commonly referred to as a "Hindley" worm, is mounted for gauging;

Fig. 1a is a fragmentary elevation showing a dial indicator in gauging position;

Fig. 2 is a front elevation of the machine shown in Fig. 1;

Fig. 3 is a right side view in elevation;

Fig. 4 is a vertical longitudinal sectional view of the head stock taken substantially on line 4—4 of Fig. 1;

Fig. 5 is an end view taken on lines 5—5 of Fig. 4;

Fig. 6 is a vertical longitudinal section taken on lines 6—6 of Fig. 1;

Fig. 6a is a fragmentary section showing a second dial indicator in gauging position;

Fig. 7 is a vertical longitudinal section taken on lines 7—7 of Fig. 1;

Fig. 8 is a sectional view taken on lines 8—8 of Fig. 7;

Fig. 9 is a fragmentary plan view partly in section showing the manner in which a pivoted gauge bar is supported;

Fig. 11 is also a diagrammatic representation illustrating how my invention may be applied to gauge a spur gear.

Figure 10:
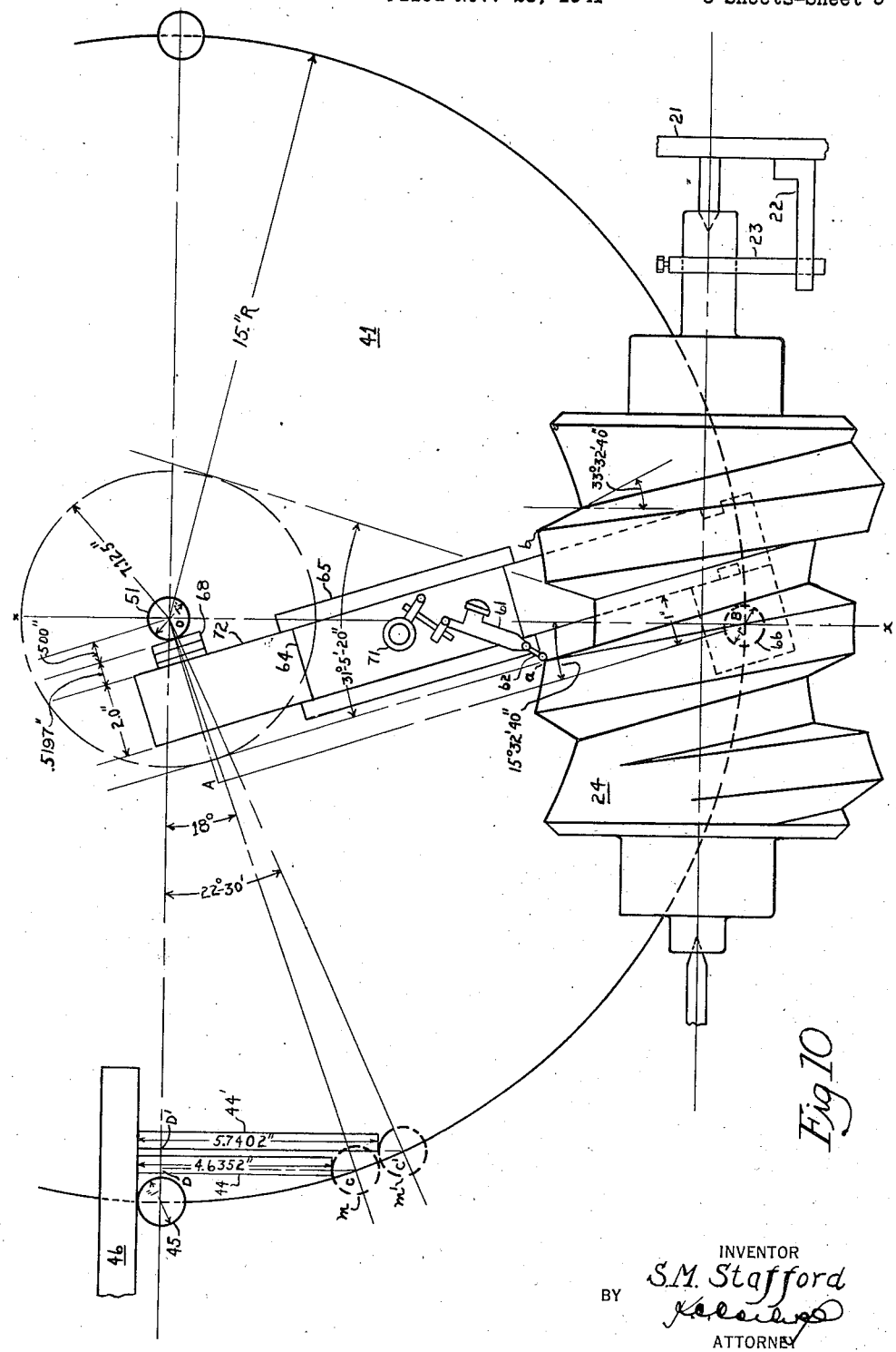
Fig. 10 is a diagrammatic view illustrating the manner in which a cone point type worm is gauged.

Referring now to the drawings, my machine comprises a base 1 on which are placed dovetail type slideways 2 and 3 arranged at right angles to each other. A slide 4 is carried by slideway 2 and is moved longitudinally thereof by means of a screw 6 which threads through a flange 7 depending from the slide 4. A handwheel 5 may be employed for turning screw 6. In order to obtain an accurate indication of any particular position of the slide 4 relative to its slideway 2, I have provided a micrometer 8 which is disposed on the frame 1. An actuating element 9 provided for moving the dial indicator of micrometer 8 is moved when abutted by gauge blocks 10 which are placed in a trough 11 and moved therealong by a projection 12 which is integral with the slide 4. The length of the train of gauge blocks 10 necessary to obtain a reference reading on the micrometer scale will of course depend upon the relative position of slide 4 longitudinally of its slideway 2.

Slide 4 carries a tailstock 13 on one end thereof which may be similar in construction to the tailstock of any well known lathe including a quill 14 adjustable longitudinally by means of handwheel 15 to permit the machine part to be set up and removed from gauging position and a removable center 16.

A headstock 17 is carried on the other end of slide 4. Both the headstock 17 and tailstock 13 may be moved longitudinally of the slide 4 and are maintained in alignment by sliding keys 18. This arrangement permits machine parts of various lengths to be supported. The head and tailstocks may be maintained in any adjusted position by means of T bolt and lock nut assemblies 19.

Headstock 17 carries a spindle 20 upon which a face plate 21 is fastened. A driver 22 carried by plate 21 is arranged to engage a dog 23 fastened to the machine part to be gauged (cone worm 24 in the application illustrated) in order to obtain rotation thereof.

A vertical index sine plate 25 is mounted at the extreme right of spindle 20 and may be locked in any angular position by means of locking ring 26. Graduations 27 in degrees and fractions thereof are provided on the periphery of plate 25 for obtaining approximate angular settings of the machine part to be gauged and a sight bracket 28 may be utilized for easily reading the graduations. However, precision angular settings of the machine part are obtained through the use of gauge blocks 74, 74' (see Fig. 11) inserted between sine bar pins 30 and anvil 31 in a manner which will be fully explained hereinafter.

Arranged for movement longitudinally along slideway 3 is a slide 32 which is adjustable in position by means of screw 33 and flange 34 which depends from slide 32. A handwheel 35 may be provided for turning screw 33.

In order to obtain an accurate indication of any particular position of slide 32 relative to slideway 3, I provide a second micrometer 36 which is disposed on the frame 1. An actuating element 37 provided for moving the dial indicator of micrometer 36 is moved when abutted by gauge blocks 38, which are placed in a trough 39 and moved therealong by a projection 40 which is integral with slide 32. The length of the train of gauge blocks 38 necessary to obtain a reference reading on the micrometer scale will of course depend upon the relative position of slide 32 longitudinally of its slideway 3.

An index sine plate 41 is mounted for rotation in a horizontal plane and is suitably journaled in a bearing 42 provided in member 32. Graduations 43 in degrees and fractions thereof are provided on the periphery of sine plate 41 to secure approximate angular setting. Precision angular setting of the plate 41 is obtained, however, by insertion of gauge blocks 44, 44' (shown in Fig. 10) between sine bar pin 45 and gauging bar 46. Bar 46 is supported in position by means of bracket member 47, which is secured to extension 48 provided on slide 32 and may be locked by means of screws 49. The manner in which plate 41 may be set accurately to any angle is hereinafter described in detail.

In order to permit various peripheries of a machine part to be gauged such as for example the outside and root diameters of a worm, I have provided a pivot hub 50 which is journaled for rotation about the axis of plate 41 on vertical pin 51. Hub 50 has a spoke portion 52 which contains a bore 53 into which an extensible arm 54 is received. A third micrometer 55 is suitably supported at the end of arm 54. To raise micrometer 55 to gauging position with the machine part, a sleeve 60 may be slipped over pin 51. Gauge blocks 56 may be inserted between the actuator 57 of micrometer 55 and a sleeve 58 which is placed over pin 59 to set up the diameters to be gauged, and its manner of operation will be fully described later.

To check the tooth angle on a machine part and to gauge the pitch thereof, I provide a sensitive indicator 61 of any suitable type utilizing a pivoted operating element 62, such as the well known Federal Universal Test Indicator which has a scale readable in ten-thousandths of an inch deflection in any manner of its operating member 62. Indicator 61 is suitably supported in gauging position on a vertical rod 63 by means of a collar 71 attached thereto. Rod 63 is carried by a slide 64, the latter being movable reciprocally along a guide member 65. The guide 65 is fastened to a bar 72 which is pivotally mounted on pin 66 to permit the actuator 62 of indicator 61 to be set for movement along any desired angle with respect to the machine part.

The desired angle is obtained mathematically and set by means of gauge blocks 68 (shown on Fig. 10 and described fully hereinafter) inserted between pin 51 and bar 72. If desired, a set screw 69 may be threaded through a fixed support 70 to prevent movement of bar 72 after it has once been set.

In order that my invention may be better understood, a description of its operation as applied in gauging certain dimensions of a cone worm will now be given.

Let it be assumed that the worm 24 and its mating gear (not shown) were made to specifications given in the following table:

| | |
|---|---|
| Number of teeth in mating gear | 20 |
| Pitch radius of worm inches | 3.500 |
| Pitch radius of mating gear do | 10.350 |
| Chord of tooth of mating gear do | 1.5922 |
| Chord of space between teeth on mating gear inches | 1.656 |
| Diametral pitch of mating gear do | .966 |
| Pitch diameter of mating gear do | 20.700 |
| Pitch diameter of worm do | 7.000 |
| Radius of base circle of mating gear inches | 7.125 |
| Circular pitch of mating gear do | 3.2565 |
| Lead of worm do | 3.2565 |
| Major radius of gear do | 10.956 |

With reference in particular to Figs. 1, 6, 6a and 10, cone worm 24 is supported between the headstock and tailstock on members 16 and 20 and slide 4 is moved axially along slideway 2 until the central transverse axis thereof $x$—$x$ is coincident with an axis through the center of pins 51 and 66.

This may be done by swinging hub 50 about pin 51 to bring the operating member 57 of micrometer 55 into contact with the outer arcuate surface of the worm thread and axially adjusting slide 4 until the reading on micrometer 55 remains fixed as it is swung over all the threads of the worm.

The pitch radius of the mating gear for worm 24 is 10.350" and the pitch radius of the worm 3.500". Their sum, 13.850", constitutes the distance between the axis of the mating gear and the axis of the worm. In order that the center of pin 51 may occupy a position that the axis of the mating gear would occupy, slide 32 is now moved along its slideway until the distance between the center of pin 51 and the axis of the worm is equal to 13.850".

Gauge blocks 29 are then set up (see Fig. 3) and placed between anvil 31 and pin 30 so that the plate 25 (and hence worm 24) may be rotated through a given angle for purposes of gauging the worm thread.

To gauge the peripheries of worm 24, hub 50 and micrometer 55 are arranged as shown in Fig. 6. Let it be assumed that it is desired to gauge the root radius of worm 24 as measured along the $x$—$x$ axis thereof. If the thread has been cut precisely to the aforesaid specification, such radius will be equal to 13.850"—10.956"=2.894". Since the center of pin 51 is positioned 13.850" from the axis of worm 24, it follows that the periphery involved must be 13.850"—2.894" or 10.956" from the center of pin 51. As given in Fig. 10, the distance between the center of pin 51 and the center of pin 59 is equal to 15.0". If the outermost radius of sleeve 58 is 1", it will be evident that in order to set micrometer 55 for gauging at a radius of 10.956" from center of pin 51, gauge blocks 56 must be set up 15.0"—1.0"—10.956" or 3.044" and positioned as shown in Fig. 6. Micrometer 55 is then adjusted by means of extension rod 24 so that the operating member 57 thereof is slightly compressed against gauge blocks 56 to obtain a reference reading. Hub 50 and micrometer 55 are then swung from the position shown in Fig. 6 to that shown in Fig. 6a. It will be evident then that if the periphery has been cut correctly, a reading will be obtained on the dial of micrometer 55 identical with the aforesaid reference reading. Any error in this particular diameter will obviously be detected immediately, the amount of such error being equal to such difference as may exist between the reference and gauging readings on the micrometer dial.

Other radii of the worm 24 may be gauged in a similar manner.

In the present example, the circular pitch of the mating gear and thread lead of the worm are equal, and a complete revolution of the worm (in which case a point on the worm thread would move along an arcuate path from $a$ to $b$) would cause the mating gear to turn through an angle corresponding to the circular pitch of the mating gear. The value of such an angle would be equal to the total number of degrees in the complete circle divided by the number of teeth in the gear, or $$360°/20=18°$$

It will thus be evident that if operating element 62 of indicator 61 is positioned initially at point $a$ and plate 41 is turned through an 18° angle, element 62 should then be at point $b$ if the worm thread is cut to the correct lead. Any error in the lead is thus immediately detected.

This 18° angle through which plate 41 is turned must of a necessity be measured most accurately if accurate gauging is to be obtained. Peripheral angle graduations 43 on plate 41 do not meet such a degree of accuracy and can only be used for approximate setting of the angle. However, by means of my invention, a feature of which lies in the use of standard gauge blocks set up in accordance with a function of the angle, precision angle setting is available.

In particular, as shown in Fig. 10, I construct a right triangle OCD, of which side OC is 15" in length. If the plate 41 is to be turned through exactly 18°, side CD of the triangle OCD must be made equal to 15"×sine 18°, or 4.6352". Accordingly, plate 41 is turned counterclockwise and gauge blocks 44, set up to 4.6352", are inserted between pin 45 and gauging bar 46 which serves to move pin 45 to position $m$ as shown by the broken circle. As heretofore explained, as the plate 41 is thus turned through the 18° angle, member 62 will move from position $a$ to position $b$ so that the lead of the worm thread can be accurately gauged.

The accuracy of any fractional part of a lead on the worm thread from a given reference position, such as position $a$, may be determined as follows: Let it be assumed that it is desired to gauge the accuracy of the thread from position $a$ through 1 lead plus an additional ¼ of a lead which in the present example would amount to 1¼ revolutions of worm 24.

As already explained, in a single revolution of worm 24, a reference point on the thread will move in an arc to a corresponding point on the next adjacent thread such as the arc from $a$ to $b$. An additional ¼ revolution should move the point through an additional arc corresponding to ¼ of a lead which is equivalent to ¼ of a circular pitch of the mating gear, or 18°/4=4° 30'. This means that plate 41 must be turned through a total of 18°+4° 30' or 22° 30' to simulate a 1¼ lead of worm 24.

As shown in Fig. 10, I construct a right triangle OC'D', of which side OC' is 15" in length. If plate 41 is to be turned through exactly 22° 30', side C'D' of triangle OC'D' must be made equal to 15" × sine 22° 30' or 5.7402". Accordingly, plate 41 is turned counterclockwise and gauge blocks 44' set up to 5.7402", are inserted between gauge bar 46 and pin 45 which serves to move pin 45 to position $m'$ as shown by the broken lines. Plate 41 will now have been turned though an angle of 22° 30'. Worm 24 is now turned clockwise through ¼ revolution or 90° and, if the thread is cut correctly, operating element 62 of indicator 61 will now be at the edge of the thread. The ¼ revolution of worm 24 is also made by the use of gauge blocks. Referring to Fig. 3, the centers of pins 30 are spaced apart at 90° intervals. As heretofore explained, when worm 24 was set up on the machine, plate 25 was positioned by gauge blocks 29 inserted between pin 30 and anvil 31. To rotate plate 25 and hence worm 24 clockwise through exactly 90°, all that is necessary is that the blocks 29 be removed, the plate turned clockwise and the blocks reinserted between anvil 31 and pin 30'. Although I have described how the worm thread may be gauged for fractional leads of 90°, it will be evident that the thread may be gauged for any other desired fraction of thread lead.

In this particular example, the angle between inside threads of worm 24 is given as 31° 5' 20", and may be gauged in the following manner.

Transverse axis $x$—$x$ (Fig. 10) bisects this angle and thus the angle of the worm thread relative to such axis is equal to one half of the total thread angle, or, $$31°5'20''/2=15°32'40''$$

To set the operating member 62 for gauging movement along an axis which will be inclined 15° 32' 40" from axis $x$—$x$, I construct right triangle OAB of which side OB is 15" in length.

$$\text{Side OA}=15''\times\text{sine }15°\ 32'\ 40''$$
$$=4.0197''$$

However,

| | Inches |
|---|---|
| Radius of pin 51 equals | .500 |
| Width of gauge bar 46 equals | 2.000 |
| Distance between center of pin 66 and bar 72 equals | 1.000 |
| Total | 3.500 |

Therefore, if gauge blocks 68 are set up to equal 4.0197"—3.500" or .5197" and are inserted as shown between gauge bar 72 and pin 51, bar 72 will then be at an exact angle of 15° 32' 40", relative to the $x$—$x$ axis. It will be evident that by sliding member 64 along guide members 65, indicator 61 and its operating element 62 will also move at an angle of 15° 32' 40", thereby permitting accurate gauging of the thread angle of worm 24.

The opposite face of the thread angle may be gauged in a similar manner by placing gauging bar 72 and gauge blocks 68 on the opposite side of pin 51, whereupon bar 72 will then be at an angle of 15° 32' 40" on the right side of the $x$—$x$ axis.

Another gauging operation of worm 24, such as checking the outside thread angle, has not been illustrated but would be determined as follows: In the present example, the outside thread angle is equal to the pitch angle (18°) plus ½ of the angle between inside threads (15° 32' 40"), or 33° 32' 40". To place the operating member 62 of indicator 61 in position for gauging movement along such an angle it would be necessary to rotate gauge bar 72 about pin 66 so that the bar makes an angle of 33° 32' 40" with the $x$—$x$ axis. This would be done by constructing a triangle in a manner similar to that in which triangle OAB was constructed. The side of such a triangle corresponding to side OA of triangle OAB would be:

$$15''\times\text{sine }33°\ 32'\ 40''\text{ or }8.2887''$$

However, as set out above, the sum of the radius of pin 51, width of bar 72 and distance between center of pin 66 and bar 72 equals 3.500". Therefore, gauge blocks would be set up to equal 4.7887" and inserted similarly to gauge blocks 68, whereupon bar 72 would then be at an exact angle of 33° 32' 40" with respect to the $x$—$x$ axis. The opposite outside angle would be gauged in a similar manner by placing gauge bar 72 and gauge blocks set up to 4.7887" on the right side of the $x$—$x$ axis.

In Fig. 11 I have illustrated diagrammatically an application of my invention in gauging a spur gear 73 having the following dimensions:

| | |
|---|---|
| Pitch diameter inches | 16 |
| Number of teeth | 20 |
| Radius of gear at dedendum circle inches | 7.074 |
| Radius of gear at addendum circle do | 8.8 |

Gear 73 is mounted between tailstock 13 and headstock 17 similar to the manner in which worm 24 is mounted. Gauge blocks 74 are inserted between anvil 31 and pin 30 on plate 25 so that an axis through the centers of pins 30—30 lies in a horizontal plane.

Gear 73 is then arranged rotationally on its axis so that the gauging member 62 of indicator 61 is in a gauging position such as point $e$ at the edge of a gear tooth.

As stated hereinbefore, since there are 20 teeth in gear 73, a sector of the gear having an arc equal to the circular pitch of the gear would have an included angle of 360°/20, or 18°. It follows then that if member 62 of indicator 61 is at point $e$ on a gear tooth and gear 73 is turned through an arc of 18°, member 62 should then be at a corresponding position on the next adjacent tooth (point $f$) if the gear has been cut correctly. Any error in cutting is thereby immediately indicated.

As with the gauging operation of the thread lead on worm 24, this 18° angle must be determined accurately and therefore angle indicia 27 can be used only for approximate setting. Precision setting is obtained by means of gauge blocks which are set up in accordance with a function of the angle.

In particular, as shown in Fig. 11, I construct a right triangle GHK, of which side GK is equal to 12". If plate 25 is to be turned through exactly 18°, side HK of triangle GHK must be made equal to 12"×since 18°, or 3.7082".

However, gauge blocks 74 are equal to 13.8", thus plate 25 is turned counter-clockwise and gauge blocks 74' set up to 13.8"—3.7082", or 10.0918" are inserted between pin 30 and anvil 31, which serves to move pin 30 to a new position as shown by the broken circle. Thus, plate 25 and hence gear 73 will have been turned through an 18° angle and, if the gear tooth has been cut correctly, member 62 should be at point $f$. This gauging operation may of course be repeated for all the teeth on gear 73.

It will be evident that various other dimensions of the gear, such as the chord of the teeth or spaces therebetween at the addendum, pitch, base, root and clearance circles, may also be gauged by constructing triangles similar in principle to the construction of triangle GHK and using gauge blocks set up in accordance with a function of the angle of a gear sector whose chord is equal to the particular dimension to be gauged.

Likewise, it will be evident that various diameters of the gear 73 may be gauged by means of micrometer 55 which would be set up for gauging such diameter by means of gauge blocks 56 in the same manner as hereinbefore described with respect to gauging of the diameters of worm 24 and rotated into gauging position on hub 50.

While the gauging operation has been described with respect to gear teeth, it will be obvious that my apparatus may be used in a similar manner for gauging other machine parts having spaced peripheral elements, such as for example, shaft splines.

In conclusion, it will be evident that many changes and modifications of the particular embodiment which has been described may occur to those skilled in the art without departing from the spirit and scope of my invention. I thereby desire it to be understood that only such limitations as are imposed by the prior art are to be placed upon the appended claims.

The invention described herein may be manufactured and used by or for the Government of the United States of America for governmental purposes without the payment of any royalties thereon or therefor.

Having now fully described my invention, what I claim is:

1. Apparatus for gauging a machine part of the class described comprising a support, means for mounting said machine part on said support for rotation of the part on its longitudinal axis, a first reference plate including stop means thereon, means for mounting said reference plate co-axially with the longitudinal axis of the machine part for rotation therewith, a second reference plate having stop means thereon, means for mounting the second plate on said support for rotation thereon in a plane parallel with the longitudinal axis of said machine part, means including gauge block means cooperative with said stop means on each of said reference plates for permitting said plates to be rotated through any desired angle, indicator means including an actuator member therefor and means for mounting said indicator on said second plate to establish gauging contact between the actuator member and the surface of the machine part to be gauged.

2. Apparatus for gauging a machine part of the class described comprising a bed having a pair of slideways therein arranged at right angles to each other, slides for each of said slideways, cooperating tail and headstock members for supporting the machine part therebetween for rotation on its horizontal axis, means for mounting the tail and headstocks on one of said slides, a first index plate rotatable with said machine part and having stop means thereon, means including gauge block means cooperative with said stop means, for selecting any desired angle of rotation of said plate and machine part, a second index plate having stop means thereon, means for mounting the second plate on the other of said slides for rotation thereon in a plane parallel with the longitudinal axis of said machine part, means including gauge block means cooperative with said stop means on said second plate for selecting any desired angle of rotation of said second plate, indicator means including an actuator member therefor and means for supporting said indicator on the second plate, said indicator being movable to establish contact engagement between the actuator of the indicator and the surface of the machine part to be gauged.

3. The combination in claim 2 characterized by the fact that the angle of approach of the indicator with respect to the surface to be gauged in adjustable.

4. Apparatus for gauging a machine part of the class described comprising a support, means for mounting said machine part on said support for rotation of the part on its longitudinal axis, a first angle reference plate, means for supporting said plate co-axially with the longitudinal axis of the machine part, a second angle reference plate, means for mounting said plate horizontally on said support for movement therealong on an axis normal to the longitudinal axis of the machine part, means for permitting rotation of the second plate on its vertical axis, a plurality of pins on each of said plates disposed at equal radii from their respective axes of rotation, means including gauge blocks cooperative with said pins for turning each of said plates through any desired angle, indicator means including an actuator member therefor and means for supporting said indicator on said second plate for movement thereacross to establish gauging contact with the surface of the machine part.

5. Apparatus for gauging a machine part of the class described comprising a bed having a pair of slideways therein arranged at right angles to each other, slides for each of said slideways, cooperating tail and headstock members for supporting the machine part therebetween, means for mounting said tail and headstocks on one of said slides, a first index plate rotatable with said machine part and including reference pins thereon, means including gauge blocks cooperative with said pins for selecting any desired angle of rotation of said plate and machine part in a plane normal to the axis of movement of said part along its slideway, a second index plate including reference pins thereon, means for mounting last said plate on the other of said slides for rotation thereon in a plane parallel with the longitudinal axes of said slides, means including gauge blocks cooperative with the pins on the second plate for selecting any desired angle of rotation thereof, indicator means including an actuator member therefor and means for mounting said indicator on and for movement with the second plate to establish contact engagement between the actuator of the indicator and the surface of the machine to be gauged.

6. Apparatus for gauging a machine part of the class described comprising a bed having a pair of slideways therein arranged at right angles to each other, slides for each of said slideways, tailstock and headstock members, means for mounting said members on one of said slides for supporting the machine part for rotation therebetween, a first rotatable index plate including reference pins centered thereon in a circle concentric with the axis of rotation thereof, means for mounting said plate co-axially with said machine part, means including gauge blocks cooperative with said pins for permitting said plate and machine part to be turned through any desired angle in a plane normal to the longitudinal axis of the said slide, a second rotatable index plate including reference pins centered thereon in a circle concentric with the longitudinal axis thereof, means for mounting the second plate on the other of said slides for rotation thereon in a plane parallel with the longitudinal axes of said slides, means including gauge blocks cooperative with said pins on the second plate for selecting any desired angle of rotation thereof, first and second indicator means disposed respectively between each of said slides and its associated slideway for determining relative movement therebetween, third indicator means and support means therefor on the second plate, said indicator being movable thereacross to establish contact between the actuating element thereof and the surface of the machine part of be gauged.

7. Apparatus for gauging a machine part of the class described comprising a bed having a pair of slideways therein arranged at right angles to each other, slides for each of said slideways, tailstock and headstock members, means for mounting said members on one of said slides for supporting the machine part for rotation therebetween, a first rotatable index plate including reference pins centered thereon in a circle concentric with the axis of rotation thereof, means for mounting said plate co-axially with said machine part, means including gauge blocks cooperative with said pins for permitting said plate and machine part to be turned through any desired angle in a plane normal to the longitudinal axis of the said slide, a second rotatable index plate including reference pins centered thereon in a circle concentric with the longitudinal axis thereof, means for mounting the second plate on the other of said slides for rotation thereon in a plane parallel with the longitudinal axes of said slides, means including gauge blocks cooperative with said pins on the second plate for selecting any desired angle of rotation thereof, first and second indicator means disposed respectively between each of said slides and its associated slideway for determining relative movement therebetween, third indicator means and support means therefor on the second plate, said indicator being movable thereacross to establish contact between the actuating element thereof and the surface of the machine part to be gauged, and means including gauge blocks for adjusting the angle of approach of the actuating element of the third indicator with respect to the surface to be gauged.

8. The combination of claim 6 including in addition an arm, means for supporting a fourth indicator on one end thereof, means for mounting the other end for rotation about the axis of the second plate and means including gauge blocks for adjusting the length of said arm whereby diameters of the machine part may be gauged.

STEPHEN M. STAFFORD.